(No Model.)
A. W. MESTON.
ELECTRIC MOTOR.
No. 367,651. Patented Aug. 2, 1887.
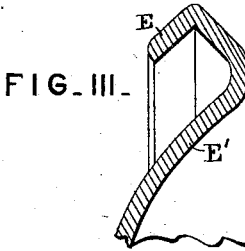
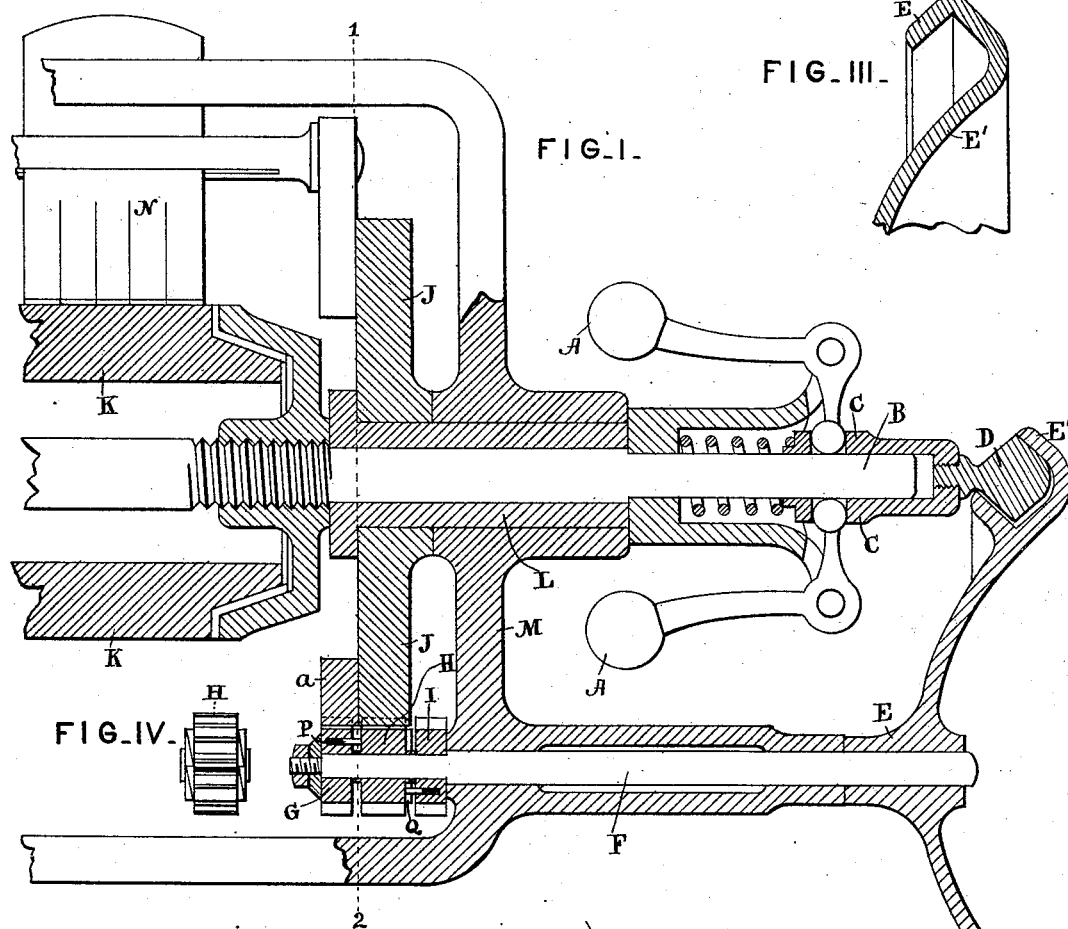
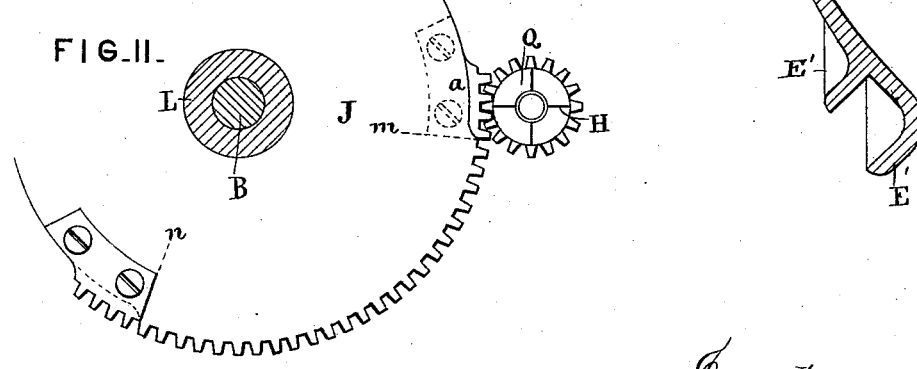
Attest:
Geo. T. Smallwood.
Edward Steen.
Inventor:
A. W. Meston,
By Knight Bros
Attys

UNITED STATES PATENT OFFICE.

ALEXANDER W. MESTON, OF ST. LOUIS, MISSOURI.

ELECTRIC MOTOR.

SPECIFICATION forming part of Letters Patent No. 367,651, dated August 2, 1887.

Application filed February 13, 1886. Serial No. 191,894. (No model.)

*To all whom it may concern:*

Be it known that I, ALEXANDER W. MESTON, of the city of St. Louis, in the State of Missouri, have invented a certain new and useful Improvement in Devices for Automatically Governing the Speed of Electric Motors, of which the following is a full, clear, and exact description, reference being had to the accompanying drawings, forming part of this specification, and in which—

Figure I is a vertical section of my improved governor. Fig. II is a detail section taken on line 1 2, Fig. I. Fig. III illustrates a modification of the large friction-wheel. Fig. IV represents a face view of the pinion or cog wheel which operates the brush supporting mechanism.

My invention relates to governing the speed of that class of motors whose power may be regulated by moving the commutator springs or brushes to different points on the commutator in relation to the field-poles of the motor; and it comprises a device to automatically move the said springs or brushes in such a manner as to maintain a uniform speed under any load within the capacity of the motor.

Similar letters refer to the same parts throughout the several views.

B, K, L, M, and N are parts of a motor which I find necessary to show in explanation of my invention, and may vary in form in different motors, K being the commutator, B the shaft, L the journal-bearing, M the frame supporting the said bearing, and N one of the commutator springs or brushes.

A represents any simple form of governor or centrifugal balance (one with a minimum amount of friction being preferable) fastened upon and revolving with the shaft B of the motor, which balance, upon any variation of the speed of the shaft B, causes the sleeve C to move back and forth upon the said shaft, thus bringing the faces of a small friction wheel or head, D, on the sleeve C, in contact with the respective faces E' of a large friction-wheel, E, and causing it (the wheel E) to revolve in different directions as the speed of the motor rises above or falls below a normal speed, to which the governor or centrifugal balance is adjusted. The motion of this wheel E is transmitted by the shaft F and gear-wheels G, H, and I to the rocker-arm J, carrying the commutator springs or brushes, which are moved thereby to different points on the commutator, thus changing the power of the motor.

Of the three pinions or gear-wheels G, H, and I, H is fastened to the shaft F, while G and I are each fastened to wheel H by ratchets which act in opposite directions. The gear-wheel H engages in cogs cut on the periphery of the rocker-arm J, between the points m and n, which correspond to the points of maximum and minimum commutation, so that when the commutator springs or brushes reach the point of maximum commutation and the speed of the motor still decreases, (as it would if overloaded or being stopped,) the wheel H disengages from the cogs in the rocker-arm J, and the wheel G engages in the cogs cut in the block a, fastened to the side of the rocker-arm J; but as the ratchet allows this wheel to slip while running in that direction, the rocker-arm stops and the brushes remain at the point of maximum commutation until the motor regains its speed, and when the normal speed is exceeded, the shaft F begins to move in the opposite direction, and the ratchet on the gear-wheel H engages the gear-wheel G, which moves the rocker-arm until the gear-wheel H again engages with the teeth on the rocker-arm J, and moves the brushes back until the speed is reduced to the normal. The same arrangement is used at the point of minimum commutation to prevent the brushes from passing that point and reversing the motor. A different combination of gears may be used, as the same result can be obtained by the use of only two gears; but I prefer to use this combination for obvious reasons.

The form of ratchet I have shown consists of pins P in the wheels G and I, that bear against notches Q on the respective sides of the wheel H, the notches being shaped to allow the pins to pass over them in one direction and not in the other, as shown in the drawings.

The small friction-wheel D may be made of paper, rubber, metal, vulcanized fiber, or any other suitable material; but the large friction-wheel E should be of metal, either brass or iron being good.

Fig. III shows another form of the large friction-wheel E, which may be used if it is found necessary or desirable to change the direction of the movement of the brushes.

I claim as my invention—

1. In combination with the shaft, commutator carried thereby, and commutator-brushes of an electric motor, a brush-supporting device pivotal about said shaft, a sleeve capable of longitudinal but not rotary movement relative to said shaft, governor arms and balls supported from said shaft and adapted to control the position of said sleeve, and gear one member of which is carried by said sleeve and the other by an independent shaft having connection with the brush-supporting device, said gear being made to engage so as to move the brushes in one or the other direction when said governor-balls are moved, substantially as set forth.

2. In combination with the shaft, commutator, and commutator-brushes of an electric motor, a yoke or disk supporting said brushes and having a toothed segment, a shaft having a pinion engaging with said segment, a friction-disk supported on said shaft, a second frictional member so supported as that its opposite faces shall engage with said disk alternately, and governor arms and balls having operative connection with the motor-shaft and with said frictional member, substantially as and for the purpose set forth.

3. In combination with a motor-shaft, commutator, and commutator-brushes, a yoke or disk supporting said brushes, having a toothed segment, additional toothed segments fixed to said yoke or disk at the extremity of the first segment in separate planes therefrom, a centrifugal governor actuated from the motor-shaft, a pinion-operating shaft, gear connecting said shafts and controlled by said governor, and three pinions on said pinion-operating shaft, one rigid on said shaft and the others loose thereon, but having oppositely-turned clutch-connection with said first pinion, the said pinions being adapted to engage with the toothed segments of the brush-supporting yoke or disk, substantially as set forth.

4. In combination with a motor-shaft, commutator, and commutator-brushes, a yoke or disk supporting said brushes, a shaft having operating connection with said yoke or disk, clutch mechanism for connecting said shaft with the motor-shaft, and a centrifugal governor operated by said motor and controlling said clutch mechanism, substantially as set forth.

ALEXANDER W. MESTON.

In presence of—
  EDW. S. KNIGHT,
  JOS. WAHLE.